US010027576B2

(12) United States Patent
Thomas et al.

(10) Patent No.: US 10,027,576 B2
(45) Date of Patent: Jul. 17, 2018

(54) METHOD, SYSTEM, AND APPARATUS FOR PROXYING INTRA-SUBNET TRAFFIC ACROSS MULTIPLE INTERFACES WITHIN NETWORKS

(71) Applicant: Juniper Networks, Inc., Sunnyvale, CA (US)

(72) Inventors: Reji Thomas, Bangalore (IN); Samson P. Ninan, Bangalore (IN); Jimmy Jose, Hosur (IN)

(73) Assignee: Juniper Networks, Inc., Sunnyvale, CA (US)

( * ) Notice: Subject to any disclaimer, the term of this patent is extended or adjusted under 35 U.S.C. 154(b) by 113 days.

(21) Appl. No.: 15/162,157

(22) Filed: May 23, 2016

(65) Prior Publication Data
US 2017/0339048 A1    Nov. 23, 2017

(51) Int. Cl.
*H04L 12/721* (2013.01)
*H04H 20/20* (2008.01)
(Continued)

(52) U.S. Cl.
CPC .............. *H04L 45/26* (2013.01); *H04H 20/20* (2013.01); *H04L 45/745* (2013.01); *H04L 61/103* (2013.01); *H04L 61/6022* (2013.01); *H04L 61/6059* (2013.01); *H04L 69/325* (2013.01); *H04L 61/6013* (2013.01)

(58) Field of Classification Search
None
See application file for complete search history.

(56) References Cited

U.S. PATENT DOCUMENTS 8,886,833 B1* 11/2014 Kopikare .......... H04L 29/08351
709/227
2006/0184663 A1* 8/2006 Takahashi ............. H04L 12/185
709/224
(Continued)

OTHER PUBLICATIONS

D. Thaler et al, Neighbor Discovery Proxies (ND Proxy), https://tools.ietf.org/html/rfc4389, Network Working Group, (Apr. 2006).
(Continued)

*Primary Examiner* — Otis L Thompson, Jr.
(74) *Attorney, Agent, or Firm* — FisherBroyles, LLP (57) ABSTRACT

The disclosed computer-implemented method may include (1) creating, at a proxy node within an IP network, a proxy group that includes a plurality of network nodes within a subnet of the IP network that are represented by a pseudo MAC address, (2) receiving a neighbor solicitation from a network node included in the proxy group, (3) identifying, within the neighbor solicitation, a link-layer address of the network node that sent the neighbor solicitation, (4) modifying the neighbor solicitation by replacing the link-layer address of the network node with the pseudo MAC address of the proxy group, and then (5) forwarding the modified neighbor solicitation to another network node included in the proxy group to facilitate completion of an NDP process in which the other network node responds to the modified neighbor solicitation with a neighbor advertisement proxied by the proxy node. Various other methods, systems, and apparatuses are also disclosed.

16 Claims, 7 Drawing Sheets

(51) Int. Cl.
*H04L 12/741* (2013.01)
*H04L 29/12* (2006.01)
*H04L 29/08* (2006.01)

(56) References Cited

U.S. PATENT DOCUMENTS

| | | | |
|---|---|---|---|
| 2008/0013538 A1* | 1/2008 | Lee | H04W 40/246 370/390 |
| 2009/0119407 A1* | 5/2009 | Krishnan | H04L 63/0281 709/228 |
| 2012/0224576 A1* | 9/2012 | Gu | H04L 61/2046 370/390 |
| 2013/0034057 A1* | 2/2013 | Aramoto | H04W 36/0011 370/328 |
| 2014/0282864 A1* | 9/2014 | Thubert | H04L 63/1458 726/3 |
| 2016/0036773 A1 | 2/2016 | Luo et al. | |
| 2016/0127229 A1* | 5/2016 | Wingrove | H04L 45/74 370/392 |

OTHER PUBLICATIONS

S. Cheshire et al., Dynamic Configuration of IPv4 Link-Local Addresses, https://tools.ietf.org/html/rfc3927, (May 2005).
T. Narten et al, Neighbor Discovery for IP version 6 (IPv6), https://tools.ietf.org/html/rfc4861, (Sep. 2007).
Thaler, D. et al.; Neighbor Discovery Proxies (ND Proxy); The Internet Engineering Task Force (IETF); Apr. 21, 2006.

\* cited by examiner

METHOD, SYSTEM, AND APPARATUS FOR PROXYING INTRA-SUBNET TRAFFIC ACROSS MULTIPLE INTERFACES WITHIN NETWORKS

INCORPORATION BY REFERENCE

This application incorporates by reference the following documents, which are concurrently filed with an Information Disclosure Statement in the U.S. Patent and Trademark Office:

The Internet Engineering Task Force (IETF) document "Neighbor Discovery Proxies (ND Proxy)" available at https://tools.ietf.org/html/rfc4389 (accessed 21 Apr. 2016);

The IETF document "Neighbor Discovery for IP version 6 (IPv6)" available at https://tools.ietf.org/html/rfc4861 (accessed 21 Apr. 2016).

BACKGROUND

Subnetting is used within Internet Protocol (IP) networks for various reasons, such as reducing network congestion, improving security, and/or connecting different types of network topologies to one another. A subnet may include multiple network nodes that are connected to one another by way of a router. In some cases, each of the network nodes within the subnet may link to the router via a single interface. In other cases, the network nodes within the subnet may link to the router via multiple interfaces. In the event that the network nodes within the subnet link to the router via multiple interfaces, the router may need to proxy intra-subnet traffic across these interfaces.

Unfortunately, conventional approaches to such proxying may have certain shortcomings and/or deficiencies. For example, a subnet may include multiple network nodes that are connected to a router via multiple interfaces. In conventional approaches, the router may be unable to exchange the link-local address of a network node connected to one interface with another network node connected to another interface even though the source and destination nodes belong to the same subnet. As a result, the router may end up dropping any packets that originate from the network node and are intended for the other network node, thereby potentially resulting in connectivity issues and/or inefficient resource consumption.

Moreover, link-local addresses may be unique only within the subnet and/or network segment. Accordingly, network nodes in different subnets and/or on different network segments may share the same link-local address. As a result, even ignoring any non-forwarding rules, the router may be unable to identify the correct destination for a packet since the link-local address of the destination node is not necessarily unique across all of the subnets and/or segments. In other words, the router may be unsure of where to forward the link-local packet and thus drop the link-local packet due to confusion and/or ambiguity.

The instant disclosure, therefore, identifies and addresses a need for methods, systems, and apparatuses for proxying intra-subnet traffic across multiple interfaces within networks.

SUMMARY

As will be described in greater detail below, the instant disclosure generally relates to methods, systems, and apparatuses for proxying intra-subnet traffic across multiple interfaces within networks. In one example, a method for accomplishing such a task may include (1) creating, at a proxy node within an IP network, a proxy group that includes a plurality of network nodes within a subnet of the IP network that are represented by a pseudo Media Access Control (MAC) address, (2) receiving, at the proxy node, a neighbor solicitation from a network node included in the proxy group, (3) identifying, within the neighbor solicitation, a link-layer address of the network node that sent the neighbor solicitation received at the proxy node, (4) modifying the neighbor solicitation by replacing, within the neighbor solicitation, the link-layer address of the network node with the pseudo MAC address of the proxy group, and then (5) forwarding the modified neighbor solicitation to at least one other network node included in the proxy group to facilitate completion of a Neighbor Discovery Protocol (NDP) process in which the other network node responds to the modified neighbor solicitation with a neighbor advertisement proxied by the proxy node.

Similarly, a system for implementing the above-described method may include (1) a creation module, stored in memory, that creates, at a proxy node within an IP network, a proxy group that includes a plurality of network nodes within a subnet of the IP network that are represented by a pseudo MAC address, (2) a receiving module, stored in memory, that receives, at the proxy node, a neighbor solicitation from a network node included in the proxy group, (3) an identification module, stored in memory, that identifies, within the neighbor solicitation, a link-layer address of the network node that sent the neighbor solicitation received at the proxy node, (4) a modification module, stored in memory, that modifies the neighbor solicitation by replacing, within the neighbor solicitation, the link-layer address of the network node with the pseudo MAC address of the proxy group, (5) a forwarding module, stored in memory, that forwards the modified neighbor solicitation to at least one other network node included in the proxy group to facilitate completion of an NDP process in which the other network node responds to the modified neighbor solicitation with a neighbor advertisement proxied by the proxy node, and (6) at least one physical processor that executes the creation module, the receiving module, the identification module, the modification module, and the forwarding module.

An apparatus for implementing the above-described method may include (1) a storage device that stores a routing table that includes entries that identify routes to a plurality of network nodes within a subnet of an IP network, (2) at least one physical processor communicatively coupled to the storage device at a proxy node within the IP network, wherein the physical processor (A) creates, at the proxy node, a proxy group that includes the plurality of network nodes and is represented by a pseudo MAC address, (B) receives, at the proxy node, a neighbor solicitation from a network node included in the proxy group, (C) identifies, within the neighbor solicitation, a link-layer address of the network node that sent the neighbor solicitation received at the proxy node, (D) modifies the neighbor solicitation by replacing, within the neighbor solicitation, the link-layer address of the network node with the pseudo MAC address of the proxy group, and then (E) forwards the modified neighbor solicitation to at least one other network node included in the proxy group to facilitate completion of an NDP process in which the other network node responds to the modified neighbor solicitation with a neighbor advertisement proxied by the proxy node.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various methods, systems, and apparatuses for proxying intra-subnet traffic across multiple interfaces within networks. The term "intra-subnet traffic," as used herein, generally refers to any type or form of communication, traffic, and/or data transfer that is passed and/or bridged by a proxy node from one network node within a subnet to another network node within the subnet. As will be explained in greater detail below, the various embodiments described herein may create a proxy group that includes and/or represents a plurality of network nodes within a single subnet of an IP network. These network nodes may be connected to a proxy node (such as a router) via multiple interfaces, and this proxy group may be identified by, represented by, and/or associated with a pseudo MAC address. Accordingly, the pseudo MAC address may identify and/or represent connections spanning multiple interfaces on a proxy node.

In one example, the various embodiments described herein may perform an NDP process to establish a proxy communication channel between multiple network nodes within the subnet. For example, a proxy node may receive a neighbor solicitation that identifies the link-layer address and/or the link-local address of the source node. In this example, the proxy node may create a neighbor entry in its neighbor cache for the source node at the interface corresponding to the source node. This neighbor entry may identify the current state of the source node as "REACHABLE" and/or include the link-layer and/or link-local addresses of the source node.

Continuing with this example, the proxy node may look up the link-layer and/or link-local address of the source node and/or determine, based at least in part on one of these addresses, that the source node is included in the proxy group. The proxy node may then look up the link-layer and/or link-local addresses of all other network nodes included in the proxy group based at least in part on the pseudo MAC address. Additionally or alternatively, in the event that the source node is aware of its proxy group's pseudo MAC address, the source node may include the pseudo MAC address in the neighbor solicitation. In this case, the source node may look up the link-layer and/or link-local addresses of all the other network nodes included in the proxy group based at least in part on the pseudo MAC address identified in the neighbor solicitation.

Either way, the proxy node may create neighbor entries within its neighbor cache for all the destination nodes at their corresponding interfaces. These neighbor entries may identify the current state of the destination nodes as "INCOMPLETE". The proxy node may then replace the source link-layer address included in the neighbor solicitation with the pseudo MAC address of the proxy group. Upon replacing the source link-layer address in this way, the proxy node may forward the neighbor solicitation to all the other network nodes included in the proxy group via the interfaces that link to those network nodes.

Upon receiving the neighbor solicitation, the destination nodes may each process the neighbor solicitation by creating a neighbor entry for the source node in their respective neighbor caches. These neighbor entries may each identify the current state of the source node as "REACHABLE" and/or include the pseudo MAC address of the proxy group and/or the link-local address of the source node. These nodes may then each send a neighbor advertisement back to the proxy node in response to the neighbor solicitation. These neighbor advertisements may include the link-layer and/or link-local addresses of the nodes that sent them to the proxy node.

Upon receiving one of these neighbor advertisements, the proxy node may process the neighbor advertisement by modifying the neighbor entry for the node that sent the neighbor advertisement within its neighbor cache to indicate that the current state of that node as "REACHABLE". The proxy node may replace the target link-layer address included in the neighbor advertisement with the pseudo MAC address of the proxy group. The proxy node may then forward the neighbor advertisement to the network node that initiated the neighbor solicitation via the interface that links to that node.

Upon receiving one of these neighbor advertisements, the network node that initiated the neighbor solicitation may process the neighbor advertisement by modifying an existing neighbor entry for the node that sent the neighbor advertisement in its neighbor cache. This neighbor entry may identify the current state of the node that sent the neighbor advertisement as "REACHABLE" and/or include the pseudo MAC address of the proxy group and/or that node's link-local address. The node that initiated the neighbor solicitation may then communicate with the other nodes within the subnet via the proxy node even in the event that such nodes are connected to the proxy node via different interfaces.

Figure 1:
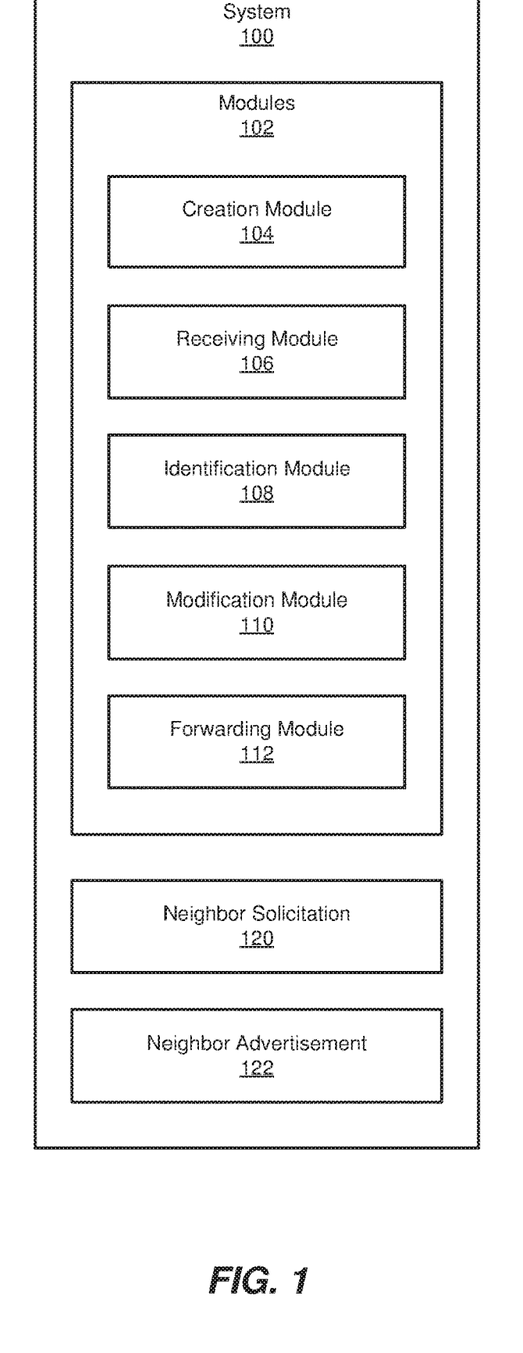
FIG. 1 is a block diagram of an exemplary system for proxying intra-subnet traffic across multiple interfaces within networks.
Figure 2:
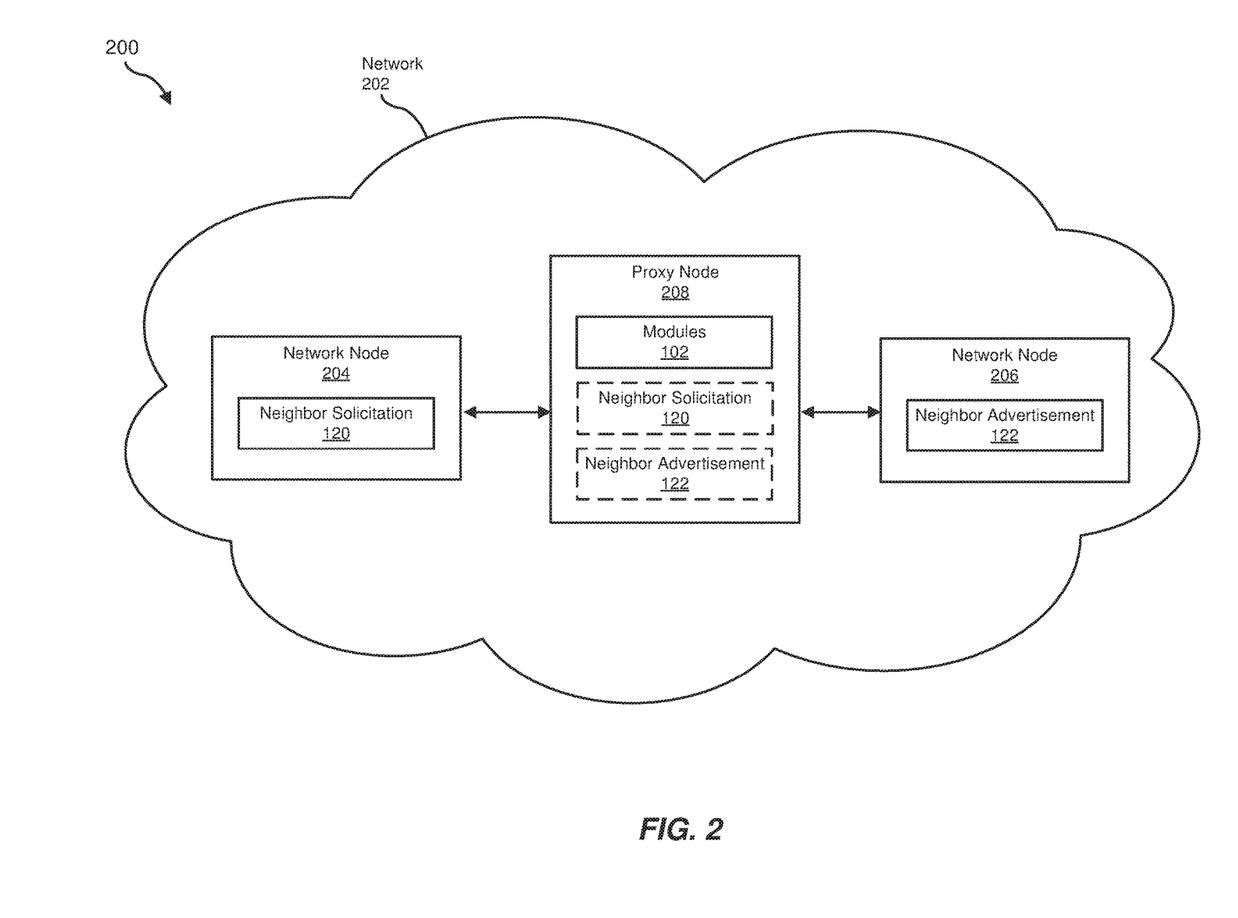
FIG. 2 is a block diagram of an additional exemplary system for proxying intra-subnet traffic across multiple interfaces within networks.

The following will provide, with reference to FIGS. 1 and 2, detailed descriptions of exemplary systems for proxying intra-subnet traffic across multiple interfaces within networks. Detailed descriptions of corresponding computer-implemented methods will be provided in connection with FIG. 3. Detailed descriptions of an exemplary representation of a proxy group, an exemplary neighbor solicitation, and an exemplary neighbor advertisement will be provided in connection with FIGS. 4, 5, and 6, respectively. In addition, detailed descriptions of an exemplary computing system capable of implementing one or more of the embodiments described herein will be provided in connection with FIG. 7.

FIG. 1 is a block diagram of an exemplary system 100 for proxying intra-subnet traffic across multiple interfaces within networks. As illustrated in this figure, exemplary system 100 may include one or more modules 102 for performing one or more tasks. For example, and as will be explained in greater detail below, exemplary system 100 may include a creation module 104 that creates, at a proxy node within an IP network, a proxy group that includes a plurality of network nodes within a subnet that are represented by a pseudo MAC address. Exemplary system 100 may also include a receiving module 106 that receives, at the proxy node, a neighbor solicitation from a network node included in the proxy group.

In addition, exemplary system 100 may include an identification module 108 that identifies, within the neighbor solicitation, a link-layer address of the network node that sent the neighbor solicitation received at the proxy node. Exemplary system 100 may further include a modification module 110 that modifies the neighbor solicitation by replacing, within the neighbor solicitation, the link-layer address of the network node with the pseudo MAC address of the proxy group. Finally, exemplary system 100 may include a forwarding module 112 that forwards the modified neighbor solicitation to at least one other network node included in the proxy group to facilitate completion of an NDP process. Although illustrated as separate elements, one or more of modules 102 in FIG. 1 may represent portions of a single module (such as a destination MAC access control filter) or a single application (such as a network operating system).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as any of the devices illustrated in FIG. 2 (e.g., network nodes 204 and 206 and/or proxy node 208) and/or computing system 700 in FIG. 7. One or more of modules 102 in FIG. 1 may also represent all or portions of one or more special-purpose computers configured to perform one or more tasks.

As illustrated in FIG. 1, system 100 may also include one or more neighbor solicitations, such as neighbor solicitation 120. The term "neighbor solicitation," as used herein, generally refers to any type or form of communication, ping, and/or packet that initiates an NDP process for discovering a network node's neighbors and/or establishing a proxy communication channel with the network node's neighbors via a proxy node. In one example, a network node may create neighbor solicitation 120 and/or send the same to a proxy node capable of proxying intra-subnet traffic across multiple interfaces. This proxy node may then forward neighbor solicitation 120 to one or more other network nodes that neighbor the network node that created neighbor solicitation 120.

In some examples, neighbor solicitation 120 may include and/or identify the link-layer address and/or link-local address of the originating network node. Additionally or alternatively, neighbor solicitation 120 may include and/or identify the pseudo MAC address of a proxy group that includes that network node. This proxy group may also include all other network nodes within the same subnet as the network node that created neighbor solicitation 120.

In some examples, neighbor solicitation 120 may include and/or represent a multicast packet that is destined for all other network nodes included in that proxy group. In such examples, neighbor solicitation 120 may traverse from the originating network node to all other network nodes included in that proxy group via the proxy node. Neighbor solicitation 120 may trigger and/or prompt each of those other network nodes to create a neighbor advertisement (such as neighbor advertisement 122).

As illustrated in FIG. 1, system 100 may further include one or more neighbor advertisements, such as neighbor advertisement 122. The term "neighbor advertisement," as used herein, generally refers to any type or form of communication, ping, and/or packet that completes an NDP process for discovering a network node's neighbors and/or establishing a proxy communication channel with the network node's neighbors via a proxy node. In one example, a network node may receive neighbor solicitation 120 from the originating network node via the proxy node. In response to receiving neighbor solicitation 120, this network node may create neighbor advertisement 122 and/or send the same to the proxy node. In this example, the proxy node may then forward neighbor advertisement 122 to the network node that created neighbor solicitation 120.

In this example, neighbor advertisement 122 may include and/or identify the link-layer address and/or link-local address of the network node that received neighbor solicitation 120. Additionally or alternatively, neighbor advertisement 122 may include and/or identify the pseudo MAC address of the proxy group that includes both the network node that created neighbor solicitation 120 and the network node that created neighbor advertisement 122.

In some examples, neighbor advertisement 122 may include and/or represent a unicast packet that is destined for the network node that initiated the NDP process by way of neighbor solicitation 120. In such examples, neighbor advertisement 122 may traverse from the network node that received neighbor solicitation 120 to the network node that created neighbor solicitation 120. Neighbor advertisement 122 may effectively complete the NDP process, thereby enabling these network nodes to communicate with one another by way of the proxy node.

Exemplary system 100 in FIG. 1 may be implemented in a variety of ways. For example, all or a portion of exemplary system 100 may represent portions of exemplary system 200 in FIG. 2. As shown in FIG. 2, system 200 may include and/or represent a network 202 that facilitates communication to one or more computing devices (not necessarily illustrated in FIG. 2). In this example, network 202 may include and/or represent network nodes 204 and 206 that are connected to a proxy node 208.

In one example, network nodes 204 and 206 may be included in and/or represent portions of the same subnet of network 202. In this example, network node 204 may be connected to proxy node 208 via one interface, and network node 206 may be connected to proxy node 208 via another interface. Accordingly, network nodes 204 and 206 may interface with proxy node 208 by way of different links and/or segments. As a result, even though they are included in the same subnet, network nodes 204 and 206 may be unable to communicate with one another via proxy node 208 without their traffic being proxied across the different interfaces.

The term "interface," as used herein, generally refers to any type or form of circuit board with one or more ports that facilitate communication within a network and/or across a plurality of networks. Examples of such interfaces include, without limitation, Physical Interface Cards (PICs), Flexible PIC Concentrators (FPCs), FRUs, Switch Interface Boards (SIBs), line cards, control boards, routing engines, forwarding engines, combinations and/or variations of one or more of the same, and/or any other suitable interfaces.

Although FIG. 2 illustrates only network nodes 204 and 206 as being connected to proxy node 208, various other network nodes (not illustrated in FIG. 2) may also be connected to proxy node 208. Moreover, these other network nodes may be included in and/or represent portions of the same subnet as network nodes 204 and 206.

In one example, proxy node 208 may be programmed with one or more of modules 102. In this example, proxy node 208 may receive neighbor solicitation 120 from network node 204 and/or forward the same to network node 206. Additionally or alternatively, proxy node 208 may receive neighbor advertisement 122 from network node 206 and/or forward the same to network node 204.

Although not illustrated in this way in FIG. 2, network node 204 may be programmed with one or more of modules 102. In this example, network node 204 may create neighbor solicitation 120 and/or forward the same to network node 206 via proxy node 208. Additionally or alternatively, network node 204 may receive neighbor advertisement 122 from network node 206 via proxy node 208.

Although not illustrated in this way in FIG. 2, network node 206 may be programmed with one or more of modules 102. In this example, network node 206 may network node 206 may receive neighbor solicitation 120 from network node 204 via proxy node 208. Additionally or alternatively, network node 206 may create neighbor advertisement 122 and/or forward the same to network node 204 via proxy node 208.

In one example, one or more of modules 102 from FIG. 1 may, when executed by at least one processor of proxy node 208, enable that proxy node 208 to proxying intra-subnet traffic across multiple interfaces within networks. For example, and as will be described in greater detail below, one or more of modules 102 may cause proxy node 208 to (1) create a proxy group that includes network nodes 204 and 206 and is represented by a pseudo MAC address, (2) receive neighbor solicitation 120 from network node 204 included in the proxy group, (3) identifying a link-layer address of network node 204 within the neighbor solicitation, (4) modifying the neighbor solicitation by replacing the link-layer address of network node 204 with the pseudo MAC address of the proxy group, and then (5) forwarding modified neighbor solicitation 122 to network node 206 to facilitate completion of an NDP process in which network node 206 responds to modified neighbor solicitation 120 with neighbor advertisement 122 proxied by proxy node 208.

Network nodes 204 and 206 each generally represent any type or form of computing system, device, and/or mechanism that facilitates communication and/or the flow of network traffic within a network and/or across networks. Examples of network nodes 202(1)-(N) include, without limitation, routers, switches, hubs, modems, bridges, repeaters, gateways, multiplexers, network adapters, network racks, chasses, servers, computing devices, client devices, portions of one or more of the same, combinations or variations of one or more of the same, and/or any other suitable network node.

Proxy node 208 generally represents any type or form of computing system, device, and/or mechanism capable of proxying traffic across multiple interfaces and/or performing Layer 2 forwarding and/or Layer 3 routing. In one example, proxy node 208 may include and/or represent a router. Examples of proxy node 208 include, without limitation, routers, switches, hubs, modems, bridges, repeaters, gateways, multiplexers, network adapters, network racks, chasses, servers, computing devices, client devices, portions of one or more of the same, combinations or variations of one or more of the same, and/or any other suitable proxy node.

Network 202 generally represents any type or form of medium and/or architecture that facilitates communication or data transfer. In one example, network 202 may represent an IP version 6 (IPv6) network. Examples of network 202 include, without limitation, an IPv6 network, an IP version 4 (IPv4) network, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, combinations or variations of one or more of the same, and/or any other suitable network. Network 202 may facilitate communication or data transfer using wireless and/or wired connections.

Figure 3:
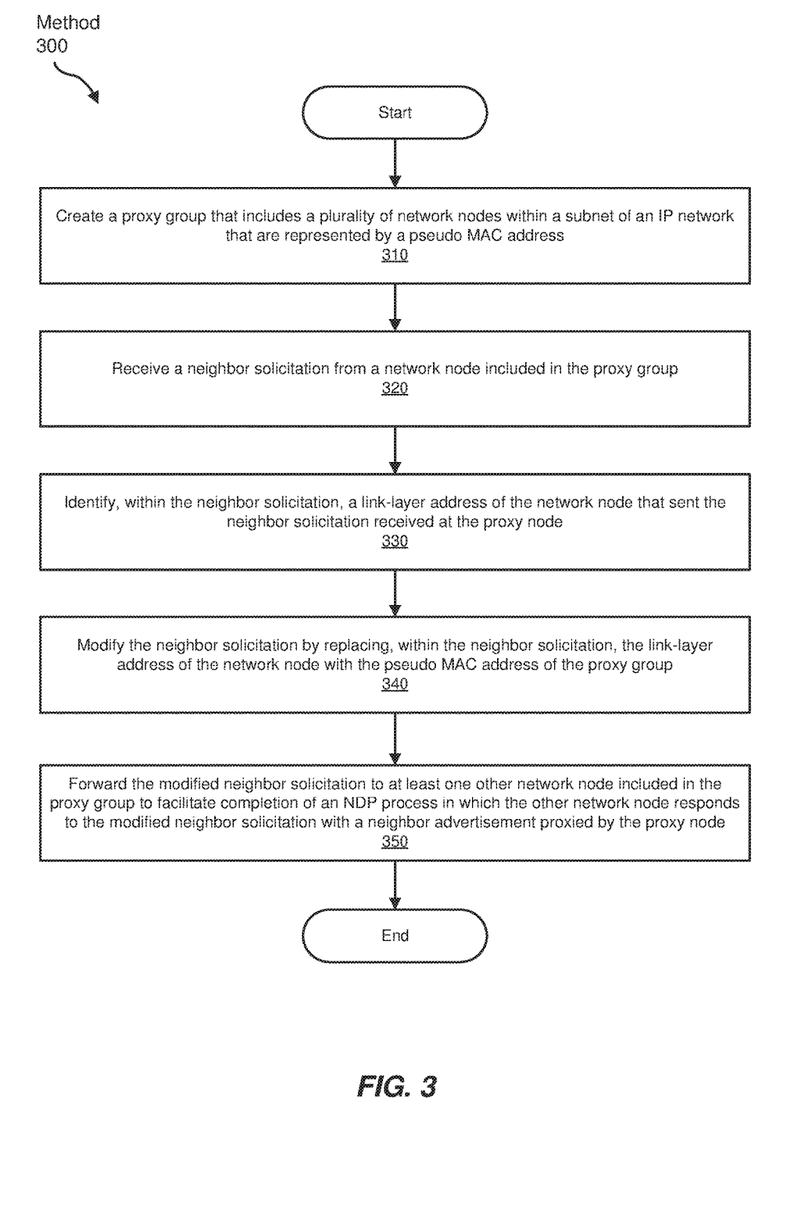
FIG. 3 is a flow diagram of an exemplary method for proxying intra-subnet traffic across multiple interfaces within networks.

FIG. 3 is a flow diagram of an exemplary computer-implemented method 300 for proxying intra-subnet traffic across multiple interfaces within networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or computing system 700 in FIG. 7.

As illustrated in FIG. 3, at step 310 one or more of the systems described herein may create a proxy group that includes a plurality of network nodes within a subnet of an IP network that are represented by a pseudo MAC address. For example, creation module 104 may, as part of proxy node 208, create a proxy group that includes network nodes 204 and 206. In this example, the proxy group may include all of the network nodes within a certain subnet of network 202. This proxy group may be represented and/or identified by a pseudo MAC address.

The term "proxy group," as used herein, generally refers to any type or form of virtual and/or logical grouping and/or representation of multiple network nodes within a network. In one example, the proxy group may include network nodes 204 and 206 as well as one or more other network nodes (not necessarily illustrated in FIG. 2). Additionally or alternatively, creation module 104 may create one or more other proxy groups that include one or more other network nodes (not necessarily illustrated in FIG. 2). In this example, the other proxy groups may include all network nodes within other subnets of network 202.

The term "pseudo MAC address," as used herein, generally refers to any type or form of address and/or identifier assigned to a proxy group. In one example, creation module 104 may generate and/or select the pseudo MAC address randomly and/or arbitrarily. In this example, the pseudo MAC address may have the same format and/or configuration as a MAC address.

The systems described herein may perform step 310 in a variety of ways and/or contexts. In some examples, creation module 104 may create the proxy group based at least in part on the subnet that includes network nodes 204 and 206. For example, identification module 108 may identify a subnet that includes network nodes 204 and 206. In this example, identification module 108 may also identify all of the network nodes within that subnet. Creation module 104 may then create the proxy group by designating a logical grouping and/or representation of those network nodes as the proxy group.

In one example, network node 204 may be connected to proxy node 208 via one PIC or FPC. In this example, network node 206 may be connected to proxy node 208 via a different PIC or FPC. Accordingly, network nodes 204 and 206 may interface with proxy node 208 by way of different links and/or segments. In other words, network nodes 204 and 206 may be "off-link" relative to one another. As a result, since they are "off-link" relative to one another, network nodes 204 and 206 may be unable to communicate with one another without their traffic being proxied by proxy node 208 across the different PICs or FPCs.

In some examples, creation module 104 may build a routing table for the proxy group. For example, creation module 104 may instantiate a routing table dedicated to the proxy group and then populate this routing table with entries that identify network routes (such as IPv6 routes) to the network nodes included in the proxy group. These routes may facilitate forwarding traffic to the network nodes included in the proxy group based at least in part on their link-local addresses. Additionally or alternatively, these routes may identify the link-layer address of each interface on proxy node 208 that links to one of the network nodes included in the proxy group.

Continuing with this example, the entries may identify and/or include the link-local addresses of the network nodes within the proxy group. These link-local addresses may each be unique to the subnet and/or the routing table for the proxy group. However, these link-local addresses may not necessarily be unique across all of the subnets and/or network segments at proxy node 208.

Returning to FIG. 3, at step 320 one or more of the systems described herein may receive a neighbor solicitation from a network node included in the proxy group. For example, receiving module 106 may, as part of proxy node 208, receive neighbor solicitation 120 from network node 204. In this example, neighbor solicitation 120 may be directed to all other network nodes included in the same as proxy group as network node 204. Neighbor solicitation 120 may effectively initiate an NDP process for discovering the intra-subnet neighbors of network node 204. Upon completion of this NDP process network node 204 may be able to send network traffic proxied by proxy node 208 to other network nodes within the same subnet even in the event that these other nodes are "off-link".

In one example, neighbor solicitation 120 may identify and/or include the link-local address of network node 204. In this example, the link-local address may represent and/or correspond to the IP address of network node 204. Additionally or alternatively, neighbor solicitation 120 may identify and/or include the link-layer address of network node 204. In this example, the link-layer address may represent and/or correspond to the MAC address of the interface on network node 204 that is connected to proxy node 208.

The systems described herein may perform step 320 in a variety of ways and/or contexts. In some examples, receiving module 106 may receive neighbor solicitation 120 via the interface that facilitates communication between network node 204 and proxy node 208. For example, receiving module 106 may monitor all communications at the interface that facilitates communication between network node 204 and proxy node 208. While monitoring this interface, receiving module 106 may detect and/or receive neighbor solicitation 120.

Returning to FIG. 3, at step 330 one or more of the systems described herein may identify a link-layer address of the network node that sent the neighbor solicitation received at the proxy node. For example, identification module 108 may, as part of proxy node 208, identify the link-layer address of network node 204 within neighbor solicitation 120. As indicated above, this link-layer address may represent and/or correspond to the MAC address of the interface on network node 204 that is connected to proxy node 208.

The systems described herein may perform step 330 in a variety of ways and/or contexts. In some examples, identification module 108 may identify the link-layer address by searching neighbor solicitation 120. For example, identification module 108 may search neighbor solicitation 120 for a Source Link-Layer Address (SLLA) option. In this example, the SLLA option may identify and/or include the link-layer address of network node 204. This link-layer address may indicate and/or suggest that network node 204 created and/or sent neighbor solicitation 120. Accordingly, identification module 108 may determine that network node 204 created and/or sent neighbor solicitation 120 based at least in part on this link-layer address.

Upon identifying the link-layer address of network node 204 within neighbor solicitation 120, creation module 104 may create an entry for network node 204 within the neighbor cache of proxy node 208. In this example, the entry for network node 204 may identify the link-layer address and/or link-local address of network node 204. Additionally or alternatively, the entry for network node 204 may identify the link-local address route to network node 204 and/or the link-layer address of the interface on proxy node 208 that links to network node 204. This entry may also indicate a "REACHABLE" state for network node 204.

Similarly, creation module 104 may create an entry for network node 206 within the neighbor cache of proxy node 208. In this example, the entry for network node 206 may identify the link-layer address and/or link-local address of network node 206. Additionally or alternatively, the entry for network node 206 may identify the link-local address route to network node 206 and/or the link-layer address of the interface on proxy node 208 that links to network node 206. This entry may also indicate an "INCOMPLETE" state for network node 206.

Returning to FIG. 3, at step 340 one or more of the systems described herein may modify the neighbor solicitation by replacing, within the neighbor solicitation, the link-layer address of the network node with the pseudo MAC address of the proxy group. For example, modification module 110 may, as part of proxy node 208, modify neighbor solicitation 120 by replacing the link-layer address of network node 204 with pseudo MAC address of the proxy group. In this example, the pseudo MAC address may replace the link-layer address of network node 204 within the SLLA option of neighbor solicitation 120.

The systems described herein may perform step 340 in a variety of ways and/or contexts. In some examples, modification module 110 may modify neighbor solicitation 120 by replacing the link-layer address of network node 204 within the SLLA option of neighbor solicitation 120. For example, modification module 110 may remove and/or delete the link-layer address of network node 204 from the SLLA option of neighbor solicitation 120. In this example, modification module 110 may add and/or insert the pseudo MAC address of the proxy group within the SLLA option of neighbor solicitation 120.

Returning to FIG. 3, at step 350 one or more of the systems described herein may forward the modified neighbor solicitation to at least one other network node included in the proxy group to facilitate completion of the NDP process. For example, forwarding module 112 may, as part of proxy node 208, forward modified neighbor solicitation 120 to at least network node 206. By forwarding modified neighbor solicitation 120 to network node 206 in this way, forwarding module 112 may trigger and/or prompt network node 206 to respond to neighbor solicitation 120 with neighbor advertisement 122 proxied by proxy node 208, thereby facilitating completion of the NDP process.

The systems described herein may perform step 350 in a variety of ways and/or contexts. In some examples, forwarding module 112 may forward neighbor solicitation 120 to network node 206 due at least in part to network node 206 being included in the same subnet as network node 204. For example, identification module 108 may determine that neighbor solicitation 120 is a multicast packet. As a result, forwarding module 112 may forward neighbor solicitation 120 to all other network nodes included in the same subnet as network node 204. Since network node 206 is included in the same subnet as network node 204, forwarding module 112 may forward neighbor solicitation 120 to network node 206. Forwarding module 112 may also forward neighbor solicitation 120 to any other network nodes (not necessarily illustrated in FIG. 2) that are included in the same subnet as network node 204.

Figure 5:
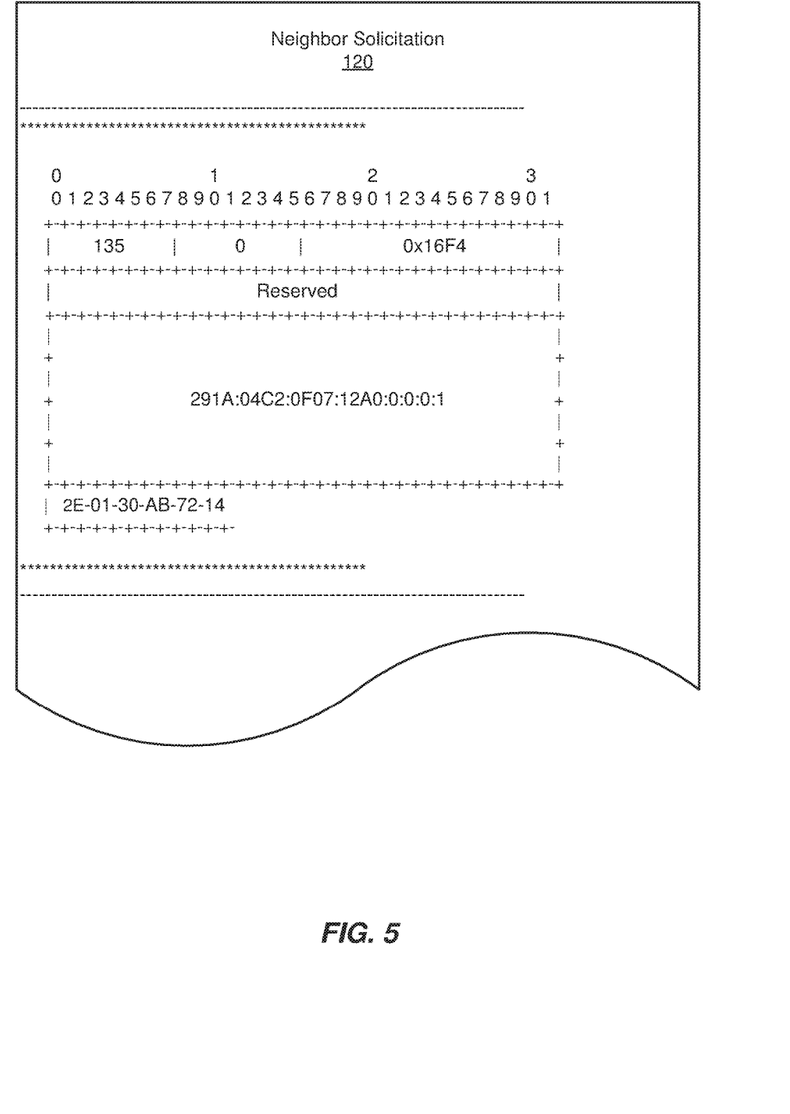
FIG. 5 is an illustration of an exemplary neighbor solicitation.

As a specific example, receiving module 106 may receive neighbor solicitation 120 in FIG. 5. As illustrated in FIG. 5, neighbor solicitation 120 may identify and/or include certain Internet Control Message Protocol (ICMP) fields, such as a packet-type field (in this example, "135" indicative of a neighbor solicitation), a code field (in this example, "0"), a checksum field (in this example, "0x16FA"), a reserved field, and/or a target address field (in this example, "291A: 04C2:0F07:12A0:0:0:0:1," which represents the link-local IP address of network node 206). In addition, neighbor solicitation 120 may identify and/or include an SLLA option field (in this example, "2E-01-30-AB-72-14," which represents the link-layer MAC address of network node 204). Although not illustrated in FIG. 5, neighbor solicitation 120 may also identify and/or include the link-local address and/or link-layer address of network node 204 in the source address IP field.

After neighbor solicitation 120 has arrived at proxy node 208, identification module 108 may identify the "2E-01-30-AB-72-14" link-layer address in the SLLA option field. Identification module 108 may then search for a proxy group that includes the network node that sent neighbor solicitation 120. For example, identification module 108 may search a database on proxy node 208 for a proxy group that includes a network node whose link-layer address is "2E-01-30-AB-72-14". During this search, identification module 108 may identify proxy group 400 in FIG. 4 as including network node 204 whose link-layer address is "2E-01-30-AB-72-14".

Figure 4:
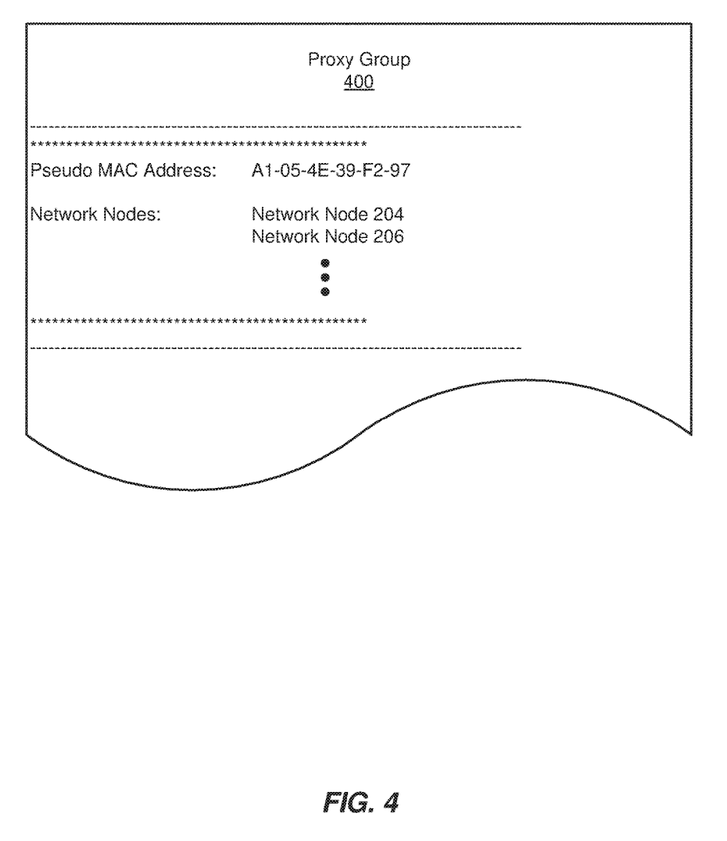
FIG. 4 is an illustration of an exemplary representation of a proxy group that includes a plurality of network nodes within a network proxying intra-subnet traffic across multiple interfaces within networks.

As illustrated in FIG. 4, proxy group 400 may include network nodes 204 and 206 among others. In this example, proxy group 400 may be assigned and/or associated with pseudo MAC address "A1-05-4E-39-F2-97". Modification module 110 may modify neighbor solicitation 120 at proxy node 208 by replacing the "2E-01-30-AB-72-14" link-layer address with the "A1-05-4E-39-F2-97" pseudo MAC address in the SLLA option field. Upon completion of this modification, forwarding module 112 may forward modified neighbor solicitation 120 to network node 206 and/or any other network nodes (not necessarily illustrated in FIG. 2) that are included in the same subnet as network node 204.

In some examples, network node 206 may receive neighbor solicitation 120 from proxy node 208. In response to receiving neighbor solicitation 120, network node 206 may process neighbor solicitation 120 by creating a neighbor entry in its neighbor cache for network node 204. This neighbor entry may identify the current state of network node 204 as "REACHABLE" and/or map network node 204 to pseudo MAC address "A1-05-4E-39-F2-97" and the link-local address of network node 204.

Figure 6:
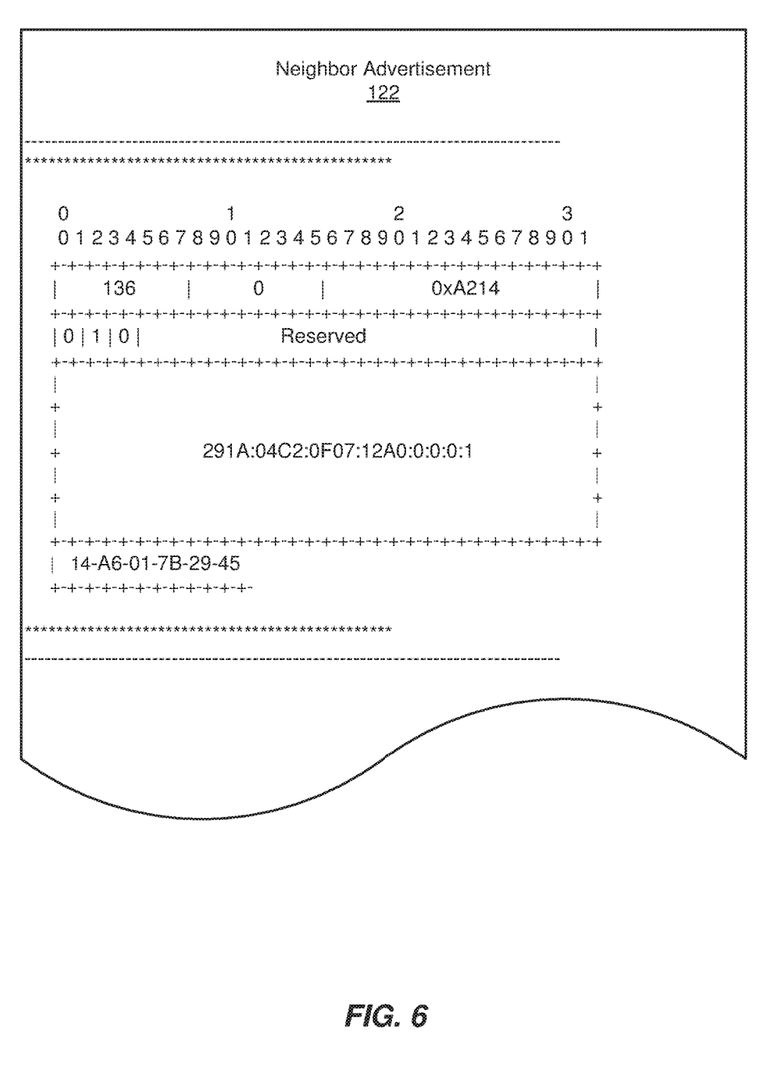
FIG. 6 is an illustration of an exemplary neighbor advertisement.

Upon creating that neighbor entry in its neighbor cache, network node 206 may send neighbor advertisement 122 back to proxy node 208 in response to neighbor solicitation 120 to facilitate completion of the NDP process. As illustrated in FIG. 6, neighbor advertisement 122 may identify and/or include certain ICMP fields, such as a packet-type field (in this example, "136" indicative of a neighbor solicitation), a code field (in this example, "0"), a checksum field (in this example, "0xA214"), a reserved field, and/or a target address field (in this example, "291A:04C2:0F07:12A0:0: 0:0:1," which represents the link-local IP address of network node 206). In addition, neighbor advertisement 122 may identify and/or include a Target Link-Layer Address (TLLA) option field (in this example, "14-A6-01-7B-29-45," which represents the link-layer MAC address of network node 206). Although not illustrated in FIG. 6, neighbor advertisement 122 may also identify and/or include the link-local address and/or link-layer address of network node 206 in the source address IP field.

Upon receiving neighbor advertisement 122 from network node 206, proxy node 208 may process neighbor advertisement 122 by modifying the existing neighbor entry in its neighbor cache for network node 206 to indicate that the current state of network node 206 is "REACHABLE". Identification module 108 may then identify the interface on proxy node 208 that links to network node 204 by (1) locating the routing table for proxy group 400 based at least in part on the "A1-05-4E-39-F2-97" pseudo MAC address and then (2) looking up the link-layer address of that interface in the routing table for proxy group 400 based at least in part on the link-local address of network node 204.

In one example, modification module 110 may modify neighbor advertisement 122 by replacing the link-layer address of network node 206 within the TLLA option with the "A1-05-4E-39-F2-97" pseudo MAC address. Forwarding module 112 may then forward neighbor advertisement 122 to network node 204 via the interface that links proxy node 208 to network node 204.

Upon receiving neighbor advertisement 122, network node 204 may process neighbor advertisement 122 by modifying the existing neighbor entry in its neighbor cache for network node 204. This modified neighbor entry may now identify the current state of network node 206 as "REACHABLE" and/or include the pseudo MAC address of proxy group 400 and/or the link-local address of network node 206. Upon completion of this NDP process, network nodes 204 and 206 may communicate with one another via the proxy node even though their subnet extends across multiple interfaces.

In some examples, proxy node 208 may receive a packet that originated from network node 204. For example, network node 204 may send a packet destined for network node 206 to proxy node 208. In one example, this packet may include and/or represent a unicast packet destined for only network node 206. Additionally or alternatively, this packet may include and/or represent a multicast packet that is destined for network node 206 and one or more additional network nodes within the same subnet.

As proxy node 208 receives the packet, a destination MAC access control filter (not explicitly illustrated in FIG. 2) may detect the packet and/or identify the link-local address of the packet's destination within the packet. This destination MAC access control filter may include and/or represent one or more of modules 102. In this example, the destination MAC access control filter may search the routing table for proxy group 400 for an entry that corresponds to the link-local address of the packet's destination. During this search, destination MAC access control filter may identify such an entry and/or the link-layer address of the interface on proxy node 208 that links to the packet's destination.

After the link-layer address of this interface has been identified, forwarding module 112 may forward the packet to network node 206 via this interface. In this example, network node 206 may receive this packet. In response to this packet, network node 206 may send another packet destined for network node 204 back to proxy node 208.

As proxy node 208 receives the other packet, the destination MAC access control filter may detect the packet and/or identify the link-local address of the other packet's destination within the other packet. In this example, the destination MAC access control filter may search the routing table for proxy group 400 for an entry that corresponds to the link-local address of the other packet's destination. During this search, destination MAC access control filter may identify such an entry and/or the link-layer address of the interface on proxy node 208 that links to the other packet's destination.

After the link-layer address of this interface has been identified, forwarding module 112 may forward the other packet to network node 204 via this interface. In this example, network node 204 may receive this packet. In this way, network nodes 204 and 206 may be able to communicate with one another via proxy node 208 even though their subnet extends across multiple interfaces.

In some examples, the destination MAC access control filter may receive a packet destined for network node 206 from network node 204. In one example, the destination MAC access control filter may determine that the forwarding engine of proxy node 208 does not currently support forwarding the packet to network node 206 in the forwarding and/or data plane. For example, the destination MAC access control filter may determine that the forwarding engine does not support a MAC access control list (sometimes also referred to as a Layer 2 access control list). Additionally or alternatively, the destination MAC access control filter may determine that an interface of proxy node 208 that links to network node 206 does not support a certain addressing scheme that facilitates forwarding the packet to network node 206 in the forwarding plane.

In response to one of these determinations, the destination MAC access control filter may punt the packet to the routing engine of proxy node 208 to enable the routing engine to forward the packet to network node 206 in the control plane. In one example, the destination MAC access control filter may punt the packet to the routing table for proxy group 400 as directed by a Layer 3 access control list in the routing engine of proxy node 208. The phrase "to punt," as used herein, generally refers to any process and/or transition in which a packet is transferred from a forwarding and/or data plane to a control plane (or vice versa).

Figure 7:
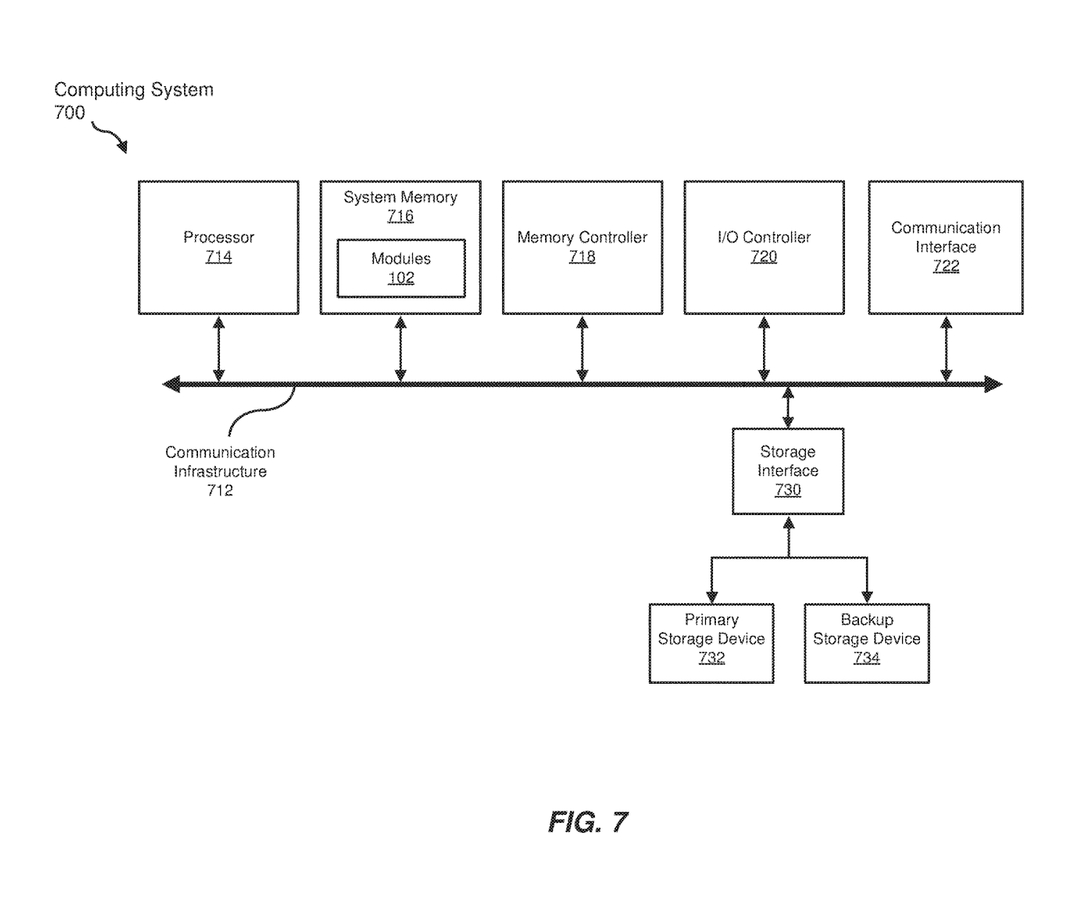
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein. In one example, computing system 700 may include and/or represent an apparatus that performs and/or constitutes a means for performing and/or implementing any other steps, methods, or processes described and/or illustrated herein.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an ASIC, a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations. In one example, system memory 616 may include and/or store one or more of modules 102 from FIG. 1.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:

creating, at a proxy node within an Internet Protocol (IP) network, a proxy group that includes a plurality of network nodes within a subnet of the IP network that are represented by a pseudo Media Access Control (MAC) address;

building, at the proxy node, a routing table for the proxy group by populating the routing table with entries that identify routes to the plurality of network nodes within the subnet;

receiving, at the proxy node, a neighbor solicitation from a network node included in the proxy group;

identifying, within the neighbor solicitation, a link-layer address of the network node that sent the neighbor solicitation received at the proxy node;

modifying the neighbor solicitation by replacing, within the neighbor solicitation, the link-layer address of the network node with the pseudo MAC address of the proxy group;

forwarding the modified neighbor solicitation to at least one other network node included in the proxy group to facilitate completion of a Neighbor Discovery Protocol (NDP) process in which the other network node responds to the modified neighbor solicitation with a neighbor advertisement proxied by the proxy node;

receiving, at the proxy node, a packet that originated from the network node and is destined for the other network node;

identifying, within the packet, a link-layer address of the network node that sent the packet received at the proxy node;

determining, based at least in part on the link-layer address and the routing table for the proxy group, that the network node that sent the packet is included in the proxy group; and in response to determining that the network node that sent the packet is included in the proxy group, forwarding the packet to the other network node included in the proxy group.

2. The method of claim 1, wherein:

receiving the neighbor solicitation from the network node included in the proxy group comprises:

receiving the neighbor solicitation; and determining, based at least in part on the link-layer address, that the network node that sent the neighbor solicitation is included in the proxy group; and modifying the neighbor solicitation comprises replacing, within the neighbor solicitation, the link-layer address of the network node with the pseudo MAC address of the proxy group in response to determining that the network node that sent the neighbor solicitation is included in the proxy group.

3. The method of claim 1, further comprising:
receiving, at the proxy node, a neighbor advertisement from the other network node included in the proxy group;
identifying, within the neighbor advertisement, a link-layer address of the other network node that sent the neighbor advertisement received at the proxy node;
modifying the neighbor advertisement by replacing, within the neighbor advertisement, the link-layer address of the other network node with the pseudo MAC address of the proxy group; and
forwarding the modified neighbor advertisement to the network node that sent the neighbor solicitation to facilitate completion of the NDP process such that the network node is able to send network traffic proxied by the proxy node to the other network node.

4. The method of claim 1, wherein the entries that identify routes to the plurality of network nodes each include:
a link-layer address of an interface of the proxy node that links to a specific network node within the subnet; and
a link-local address of the specific network node that is unique to the routing table for the proxy group.

5. The method of claim 1, wherein the packet comprises at least one of:
a unicast packet destined for the other network node; and
a multicast packet destined for the other network node and at least one additional network node.

6. The method of claim 1, further comprising:
receiving, at the proxy node, a packet that originated from the network node and is destined for the other network node;
determining that a forwarding engine of the proxy node does not currently support forwarding the packet to the other network node in a forwarding plane; and
in response to determining that the forwarding engine does not currently support forwarding the packet in the forwarding plane, punting the packet to a routing engine of the proxy node to forward the packet to the other network node in a control plane.

7. The method of claim 6, wherein determining that the forwarding engine of the proxy node does not currently support forwarding the packet in the forwarding plane comprises at least one of:
determining that the forwarding engine does not support a MAC access control list; and
determining that an interface of the proxy node that connects to the other network node does not support a certain addressing scheme that facilitates forwarding the packet to the other network node in the forwarding plane.

8. The method of claim 6, wherein punting the packet to the routing engine of the proxy node comprises punting the packet to the routing table as directed by a Layer 3 access control list in the routing engine of the proxy node.

9. A system comprising:
a creation module, stored in memory, that:
creates, at a proxy node within an Internet Protocol (IP) network, a proxy group that includes a plurality of network nodes within a subnet of the IP network that are represented by a pseudo Media Access Control (MAC) address; and
builds, at the proxy node, a routing table for the proxy group by populating the routing table with entries that identify routes to the plurality of network nodes within the subnet;
a receiving module, stored in memory, that receives, at the proxy node, a neighbor solicitation from a network node included in the proxy group;
an identification module, stored in memory, that identifies, within the neighbor solicitation, a link-layer address of the network node that sent the neighbor solicitation received at the proxy node;
a modification module, stored in memory, that modifies the neighbor solicitation by replacing, within the neighbor solicitation, the link-layer address of the network node with the pseudo MAC address of the proxy group;
a forwarding module, stored in memory, that forwards the modified neighbor solicitation to at least one other network node included in the proxy group to facilitate completion of a Neighbor Discovery Protocol (NDP) process in which the other network node responds to the modified neighbor solicitation with a neighbor advertisement proxied by the proxy node;
wherein:
the receiving module receives, at the proxy node, a packet that originated from the network node and is destined for the other network node;
the identification module:
identifies, within the packet, a link-layer address of the network node that sent the packet received at the proxy node; and
determines, based at least in part on the link-layer address and the routing table for the proxy group, that the network node that sent the packet is included in the proxy group;
the forwarding module forwards the packet to the other network node included in the proxy group in response to the determination that the network node that sent the packet is included in the proxy group; and
at least one physical processor that executes the creation module, the receiving module, the identification module, the modification module, and the forwarding module.

10. The system of claim 9, wherein:
the identification module determines, based at least in part on the link-layer address, that the network node that sent the neighbor solicitation is included in the proxy group; and
the modification module replaces, within the neighbor solicitation, the link-layer address of the network node with the pseudo MAC address of the proxy group in response to determining that the network node that sent the neighbor solicitation is included in the proxy group.

11. The system of claim 9, further comprising:
the receiving module receives, at the proxy node, a neighbor advertisement from the other network node included in the proxy group;
the identification module identifies, within the neighbor advertisement, a link-layer address of the other network node that sent the neighbor advertisement received at the proxy node;
the modification module modifies the neighbor advertisement by replacing, within the neighbor advertisement, the link-layer address of the other network node with the pseudo MAC address of the proxy group; and
the forwarding module forwards the modified neighbor advertisement to the network node that sent the neighbor solicitation to facilitate completion of the NDP process such that the network node is able to send network traffic proxied by the proxy node to the other network node.

12. The system of claim 9, wherein the entries that identify routes to the plurality of network nodes each include:
- a link-layer address of an interface of the proxy node that links to a specific network node within the subnet; and
- a link-local address of the specific network node that is unique to the routing table for the proxy group.

13. The system of claim 9, wherein the packet comprises at least one of:
- a unicast packet destined for the other network node; and
- a multicast packet destined for the other network node and at least one additional network node.

14. The system of claim 9, further comprising:
- the receiving module receives, at the proxy node, a packet that originated from the network node and is destined for the other network node;
- the identification module determines that a forwarding engine of the proxy node does not currently support forwarding the packet to the other network node in a forwarding plane; and
- the forwarding module punts the packet to a routing engine of the proxy node to forward the packet to the other network node in a control plane in response to the determination that the forwarding engine does not currently support forwarding the packet in the forwarding plane.

15. The system of claim 14, wherein the identification module determines that the forwarding engine of the proxy node does not currently support forwarding the packet in the forwarding plane by at least one of:
- determining that the forwarding engine does not support a MAC access control list; and
- determining that an interface of the proxy node that connects to the other network node does not support a certain addressing scheme that facilitates forwarding the packet to the other network node in the forwarding plane.

16. An apparatus comprising:
- a storage device that stores a routing table that includes entries that identify routes to a plurality of network nodes within a subnet of an Internet Protocol (IP) network; and
- at least one physical processor communicatively coupled to the storage device at a proxy node within the IP network, wherein the physical processor:
  - creates, at the proxy node, a proxy group that includes the plurality of network nodes and is represented by a pseudo Media Access Control (MAC) address;
  - builds, at the proxy node, a routing table for the proxy group by populating the routing table with entries that identify routes to the plurality of network nodes within the subnet;
  - receives, at the proxy node, a neighbor solicitation from a network node included in the proxy group;
  - identifies, within the neighbor solicitation, a link-layer address of the network node that sent the neighbor solicitation received at the proxy node;
  - modifies the neighbor solicitation by replacing, within the neighbor solicitation, the link-layer address of the network node with the pseudo MAC address of the proxy group; and
  - forwards the modified neighbor solicitation to at least one other network node included in the proxy group to facilitate completion of a Neighbor Discovery Protocol (NDP) process in which the other network node responds to the modified neighbor solicitation with a neighbor advertisement proxied by the proxy node;
  - receives, at the proxy node, a packet that originated from the network node and is destined for the other network node;
  - identifies, within the packet, a link-layer address of the network node that sent the packet received at the proxy node;
  - determines, based at least in part on the link-layer address and the routing table for the proxy group, that the network node that sent the packet is included in the proxy group; and
  - forwards the packet to the other network node included in the proxy group in response to determining that the network node that sent the packet is included in the proxy group.

* * * * *